United States Patent
Cho

(10) Patent No.: US 11,277,572 B2
(45) Date of Patent: Mar. 15, 2022

(54) METHOD AND DEVICE FOR COMPOSING AN IMAGE BASED ON DATA DETECTED BY FIRST AND SECOND IMAGE SENSOR

(71) Applicant: Samsung Electronics Co., Ltd., Suwon-si (KR)

(72) Inventor: Jeonghwan Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 179 days.

(21) Appl. No.: 16/614,620

(22) PCT Filed: May 14, 2018

(86) PCT No.: PCT/KR2018/005497
§ 371 (c)(1),
(2) Date: Nov. 18, 2019

(87) PCT Pub. No.: WO2018/216937
PCT Pub. Date: Nov. 29, 2018

(65) Prior Publication Data
US 2020/0186725 A1    Jun. 11, 2020

(30) Foreign Application Priority Data
May 23, 2017  (KR) .......................... 10-2017-0063330

(51) Int. Cl.
*H04N 5/225*    (2006.01)
*H04N 5/243*    (2006.01)
(Continued)

(52) U.S. Cl.
CPC .......... *H04N 5/243* (2013.01); *H04N 9/04559* (2018.08); *H04N 9/09* (2013.01)

(58) Field of Classification Search
CPC ....... H04N 5/243; H04N 9/04559; H04N 9/09
(Continued)

(56) References Cited

U.S. PATENT DOCUMENTS

| 6,373,523 B1 | 4/2002 | Jang |
| 2006/0203100 A1 | 9/2006 | Ajito et al. |

(Continued)

FOREIGN PATENT DOCUMENTS

| CN | 1875638 A | 12/2006 |
| KR | 10-2010-0042957 A | 4/2010 |

(Continued)

OTHER PUBLICATIONS

European Search Report dated Apr. 7, 2020, issued in European Application No. 18 80 5605.
(Continued)

*Primary Examiner* — Usman A Khan
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Further, the present invention provides a method and device for image processing using a dual image sensor and, more particularly, provides a method and device for image processing using image sensors having different amounts of light.

8 Claims, 9 Drawing Sheets

(51) Int. Cl.
*H04N 9/04* (2006.01)
*H04N 9/09* (2006.01)

(58) Field of Classification Search
USPC ..................................................... 348/216.1
See application file for complete search history.

(56) References Cited

U.S. PATENT DOCUMENTS

| | | | |
|---|---|---|---|
| 2010/0097495 A1* | 4/2010 | Choe | H04N 5/142 |
| | | | 348/235 |
| 2011/0149050 A1* | 6/2011 | Imada | H04N 13/139 |
| | | | 348/51 |
| 2011/0279698 A1 | 11/2011 | Yoshikawa | |
| 2012/0044372 A1 | 2/2012 | Cote et al. | |
| 2012/0162465 A1 | 6/2012 | Culbert et al. | |
| 2013/0016251 A1* | 1/2013 | Ogasahara | H04N 5/2258 |
| | | | 348/238 |
| 2015/0381907 A1* | 12/2015 | Boettiger | H01L 27/14627 |
| | | | 348/164 |
| 2016/0173835 A1 | 6/2016 | Cha et al. | |
| 2016/0269715 A1* | 9/2016 | Evans | H04N 5/33 |
| 2017/0118450 A1* | 4/2017 | Jung | H04N 9/09 |

FOREIGN PATENT DOCUMENTS

| | | |
|---|---|---|
| KR | 10-2011-0125172 A | 11/2011 |
| KR | 10-2012-0096954 A | 8/2012 |
| KR | 10-2015-0029897 A | 3/2015 |
| KR | 10-2016-0072508 A | 6/2016 |
| KR | 10-2017-0046498 A | 5/2017 |

OTHER PUBLICATIONS

Chinese Office Action Jun. 17, 2021, issued in Chinese Application No. 201880033047.4.
Korean Office Action dated Aug. 31, 2021, issued in Korean Application No. 10-2017-0063330.

* cited by examiner

METHOD AND DEVICE FOR COMPOSING AN IMAGE BASED ON DATA DETECTED BY FIRST AND SECOND IMAGE SENSOR

TECHNICAL FIELD

The disclosure relates to an image processing method and apparatus using a dual-image sensor, and more particularly, relates to an image processing method and apparatus using image sensors which are capable of detecting different amounts of light.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology," "wired/wireless communication and network infrastructure," "service interface technology," and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Generally, an image senor used for a terminal and a camera device to which 5G technology or IoT technology is applied may use a scheme of obtaining an image using an RGB sensor to which a bayer pattern is applied. In this instance, the RGB sensor enables only a required color region to pass from among red/green/blue of light that each pixel receives, converts the color region that passes into an electric signal using a photo diode, and stores the electric signal.

DETAILED DESCRIPTION OF INVENTION

Technical Problem

Light that passes the RGB sensor may pass a filter applied for each color region, and thus, the RGB sensor may obtain ⅓ of the amount of light that is received.

Therefore, in order to obtain an image in a low-light environment, an SN feature of the RGB sensor deteriorates. Accordingly, it is difficult to obtain a high-quality image.

Technical Solution

In accordance with an aspect of the disclosure, an image processing method of an electronic device that supports a dual-image sensor system includes: detecting data via a first sensor and a second sensor disposed in the electronic device; and composing an image based on data detected by the first sensor and data detected by the second sensor, wherein the first sensor and the second sensor are color sensors, and an amount of light detected by the second sensor is larger than an amount of light detected by the first sensor.

The first sensor and the second sensor include a plurality of unit cells, and wavelength regions detected by respective unit cells of the first sensor and the second sensor do not overlap each other.

The first sensor detects data using a band pass filter, and the second sensor detects data using a band refection filter.

The first sensor detects data associated with a predetermined first wavelength region, a predetermined second wavelength region, or a predetermined third wavelength region, and the second sensor detects data associated with a predetermined fourth wavelength region, a predetermined fifth wavelength region, or a predetermined sixth wavelength region, and an amount of light detected by the second sensor is two times greater than an amount of light detected by the first sensor.

The image composition operation includes: converting the domain of the data detected by the second sensor into the domain of the data detected by the first sensor; and composing an image based on the second sensor data of which the domain is converted and the data detected by the first sensor.

The image composition operation includes: performing parallax correction of the second sensor data of which the domain is converted, and composing the image based on the parallax-corrected second sensor data and the data detected by the first sensor.

In accordance with an aspect of the disclosure, an electronic device that supports a dual-image sensor system includes: a first sensor disposed in the electronic device; a second sensor disposed in the electronic device; and a controller configured to compose an image based on data detected by the first sensor and data detected by the second sensor, wherein the first sensor and the second sensor are color sensors, and an amount of light detected by the second sensor is larger than an amount of light detected by the first sensor.

The first sensor and the second sensor include a plurality of unit cells, and wavelength regions detected by respective unit cells of the first sensor and the second sensor do not overlap each other.

The first sensor includes a band pass filter, and the second sensor includes a band refection filter.

The first sensor detects data associated with a first wavelength region, a second wavelength region, or a third wavelength region, and the second sensor detects data associated with a fourth wavelength region, a fifth wavelength region, or a sixth wavelength region, and an amount of light detected by the second sensor is two times greater than an amount of light detected by the first sensor.

The controller is configured to convert the domain of the data detected by the second sensor into the domain of the data detected by the first sensor, and to compose an image based on the data of the second sensor, of which the domain is converted, and the data detected by the first sensor.

The controller performs parallax correction of the second sensor data of which the domain is converted, and composes the image based on the parallax-corrected data of the second sensor and the data detected by the first sensor.

In accordance with an aspect of the disclosure, a terminal that supports a dual-lens system includes: a first lens including a first sensor; a second lens including a second sensor; and a controller configured to compose an image based on data detected by the first lens and data detected by the second lens, wherein the first sensor and the second sensor are color sensors, and an amount of light detected by the second sensor is greater than an amount of light detected by the first sensor. The first sensor and the second sensor include a plurality of unit cells, and wavelength regions detected by respective unit cells of the first sensor and the second sensor do not overlap each other.

The first sensor includes a band pass filter, and the second sensor includes a band refection filter.

The first sensor detects data associated with a first wavelength region, a second wavelength region, or a third wavelength region, and the second sensor detects data associated with a fourth wavelength region, a fifth wavelength region, or a sixth wavelength region, and an amount of light detected by the second sensor is two times greater than an amount of light detected by the first sensor.

The controller is configured to convert the domain of the data detected by the second lens into the domain of the data detected by the first lens, and to compose an image based on the data of the second lens, of which the domain is converted, and the data detected by the first lens.

The controller performs parallax correction of the second lens data of which the domain is converted, and composes the image based on the parallax-corrected data of the second lens and the data detected by the first lens.

Advantageous Effects of Invention

According to an embodiment, the amount of light that is obtained by an image sensor may be increased over the amount of light obtained by a conventional RGB sensor, and thus, an SN feature of an image obtained in a low-light environment may be improved.

Also, an image is obtained by two color image sensors, and thus, the accuracy of image depth information may be improved.

MODE FOR THE INVENTION

Figure 1:
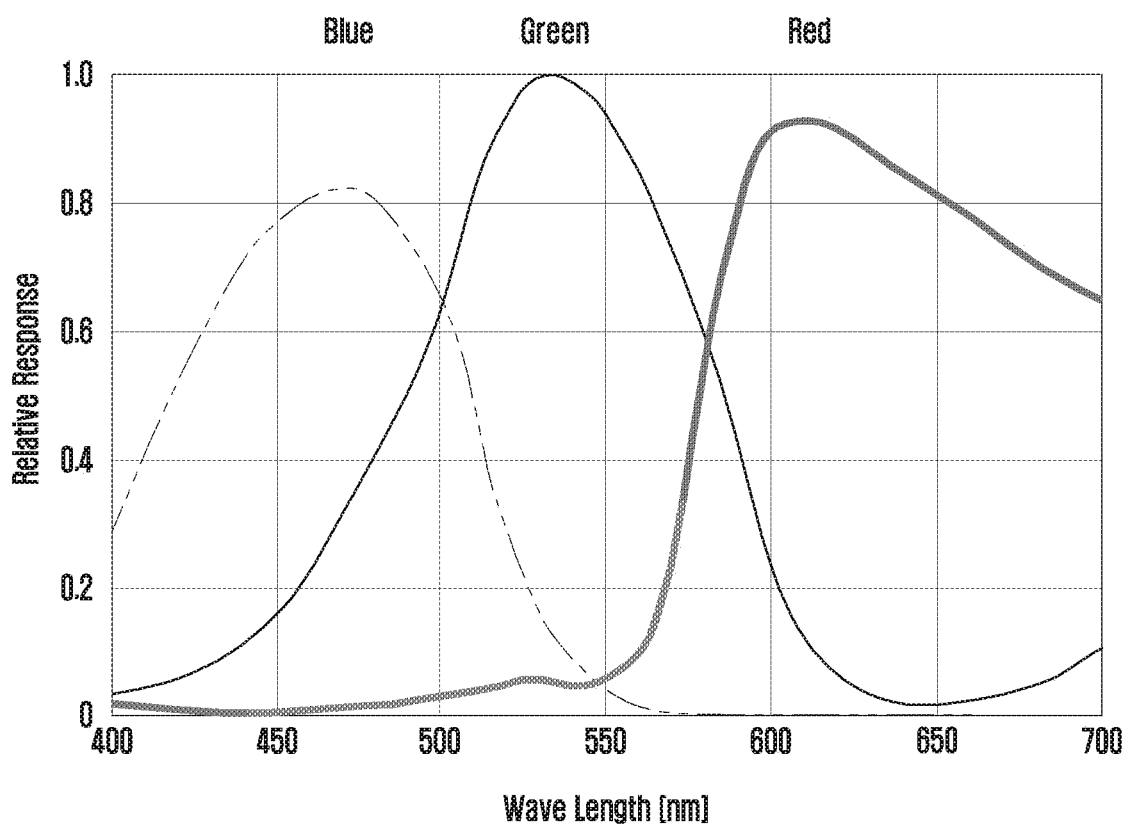
FIG. 1 is a graph of the characteristics of wavelengths of an RGB sensor.

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card. Also, in an embodiment, the '~unit' may include one or more processors.

An image sensor is a device configured to convert light input from the outside into an electric signal, and to perform image processing. That is, the image sensor is a device for detecting the intensity and the color of an optical image, and converting the detected data into digital image data.

The image sensor is used as an essential component of a portable phone camera and a digital camera, and may be classified as a charge coupled device (CCD) image sensor and a CMOS image sensor depending on an image sensing scheme.

The CCD image sensor includes a large number of optical diode devices. If light is emitted to the optical diode device, electrons may be generated according to the amount of light, and an image is generated according to the amount of generated electrons. That is, the CCD image sensor outputs electrons caused by light as they are, and may include low noise and the quality of an image is high.

Conversely, the CMOS image sensor converts the generated electrons into a voltage and outputs the same, and thus, the processing speed is fast and the amount of power consumed is low. Also, the unit cost of production is low and the CMOS image sensor is produced as on-chip, and thus, it is easily unified and manufactured in a small size. Accordingly, it is appropriate for a portable electronic device, such as a portable phone camera and a digital camera.

However, the CMOS image sensor is unstable in a low-light environment, and noise in a captured image may increase.

However, in spite of the weak point, the use rate of the CMOS image sensor is increasing in consideration of a competitive price and a small size. Accordingly, there is a desire for a method of complementing the weak point of the CMOS image sensor.

Representatively, an RGB sensor that uses a bayer pattern may be an example of the CMOS image sensor.

One of the red (R), green (G), and blue (B) filters is combined with a single sensor cell of the RGB sensor to which the bayer pattern is applied. The RGB sensor has an array in the form of a grid. Particularly, in the RGB sensor, G, and R, and B are disposed in the form of a grid, and G occupies 50% of the entire cell area, and each of R and B occupies 25% of the entire cell area.

The disclosure provides a method of processing an image using two image sensors as a method of complementing the weak point of the disclosed CMOS image sensor, that is, an RGB sensor.

FIG. 1 is a graph of the characteristics of wavelengths of an RGB sensor.

As described above, in the case of the RGB sensor, a band pass filter is included for each sensor cell. Particularly, as shown in the graph of FIG. 1, band pass filters, the wavelengths of which have center bands of approximately 470 nm, 530 nm, and 600 nm, may be applied.

The band pass filter having the center band corresponding to 470 nm may sense Blue data. The band pass filter having the center band corresponding to 530 nm may sense Green data. The band pass filter having the center band corresponding to 600 mn may sense Red data.

That is, the RGB sensor may include band pass filters, each of which enables only one of the Red, Green, Blue data to pass, and the amount of light detected by the RGB sensor may be approximately ⅓ of the amount of emitted light.

Therefore, the RGB sensor may not sense a sufficient amount of light for image processing in a low-light environment, and a large amount of noise may exist in a composed image.

In order to overcome the above, a dual-image sensor system using two RGB sensors may be considered. However, even though two RGB sensors are used, noise in the image in the low-light environment is not significantly improved. Accordingly, a new solution is needed.

The cause of incurring noise in the low-light environment is that the amount of light detected by a sensor is not enough to compose an image, as mentioned above. Therefore, a scheme of using a sensor capable of detecting a large amount of light may solve the above-mentioned problem.

Accordingly, a scheme of using a monochrome sensor capable of detecting all of emitted light, together with an RGB sensor, as a dual-image sensor may be considered. A detailed description thereof will be provided with reference to FIGS. 2A to 2D.

Figure 2A:
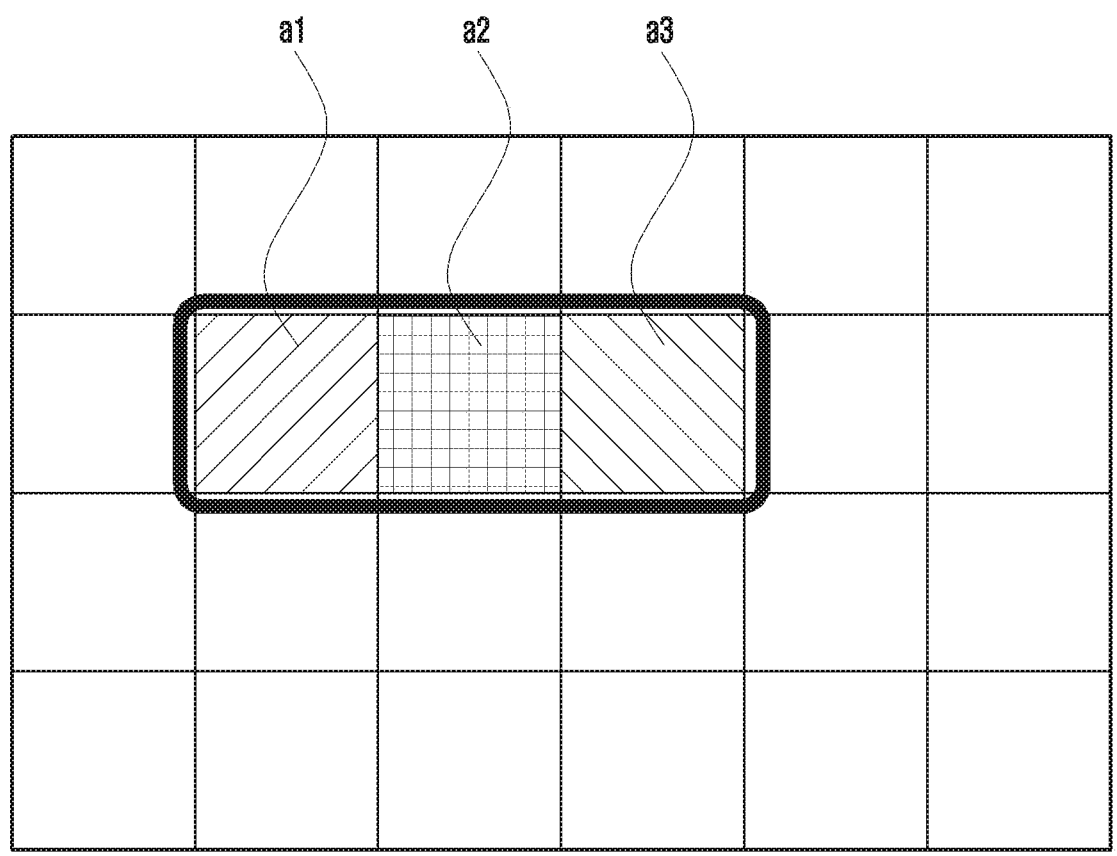
FIG. 2A is a diagram illustrating an image detected by an RGB sensor.
Figure 2B:
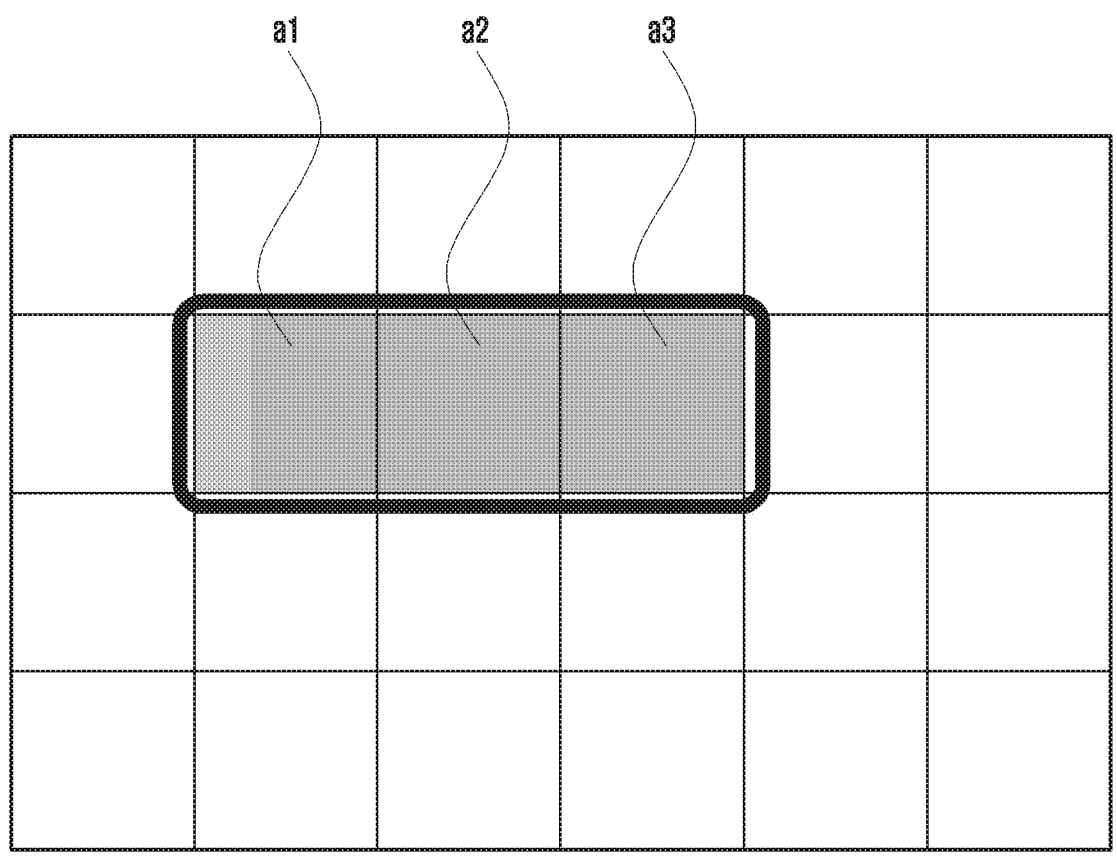
FIG. 2B is a diagram illustrating an image detected by a monochrome sensor.

FIG. 2A is a diagram illustrating an image detected by an RGB sensor, and FIG. 2B is a diagram illustrating an image detected by a monochrome sensor.

More particularly, FIGS. 2A and 2B are diagrams illustrating Macbeth chart data obtained from an RGB sensor and a monochrome sensor, and the Macbeth chart indicates a color chart used for color measurement and comparison.

Here, the monochrome sensor is a sensor that does not include a band pass filter, and may sense light in a wide wavelength range (a range from 400 nm to 700 nm). Accordingly, image processing without noise may be possible in a low-light environment.

The monochrome sensor detects the magnification and chromatic aberration of an image as brightness information. Accordingly, the degree of definition of a color image may be decreased, and generally, the magnification and chromatic aberration is uncorrectable.

Therefore, if a monochrome sensor is used, Regardless of whether the SN performance of the sensor in the low-light environment is improved, clarity in color images can be reduced due to inconsistencies in color separation in monochrome sensors.

In a part indicated by a broken line in FIG. 2A, which is the Macbeth chart associated with an RGB sensor, a total of three cell areas a1, a2, and a3 exist, and the cell areas have different colors from one another.

Conversely, the monochrome sensor may have the same cell image (or same color) in the same areas (a part indicated by the broken line) as those in the Macbeth chart associated with the RGB sensor.

According to an embodiment, the RGB sensor may distinguish area a1 in the part indicated by the broken line as a blue area, distinguish area a2 as a red area, and distinguish area a3 as a black area. Conversely, the monochrome sensor may sense areas a1, a2, and a3 as the same image area.

As described above, the monochrome sensor detects the chromatic aberration of an image as brightness information. A detailed description thereof will be provided with reference to FIGS. 2C and 2D.

Figure 2C:
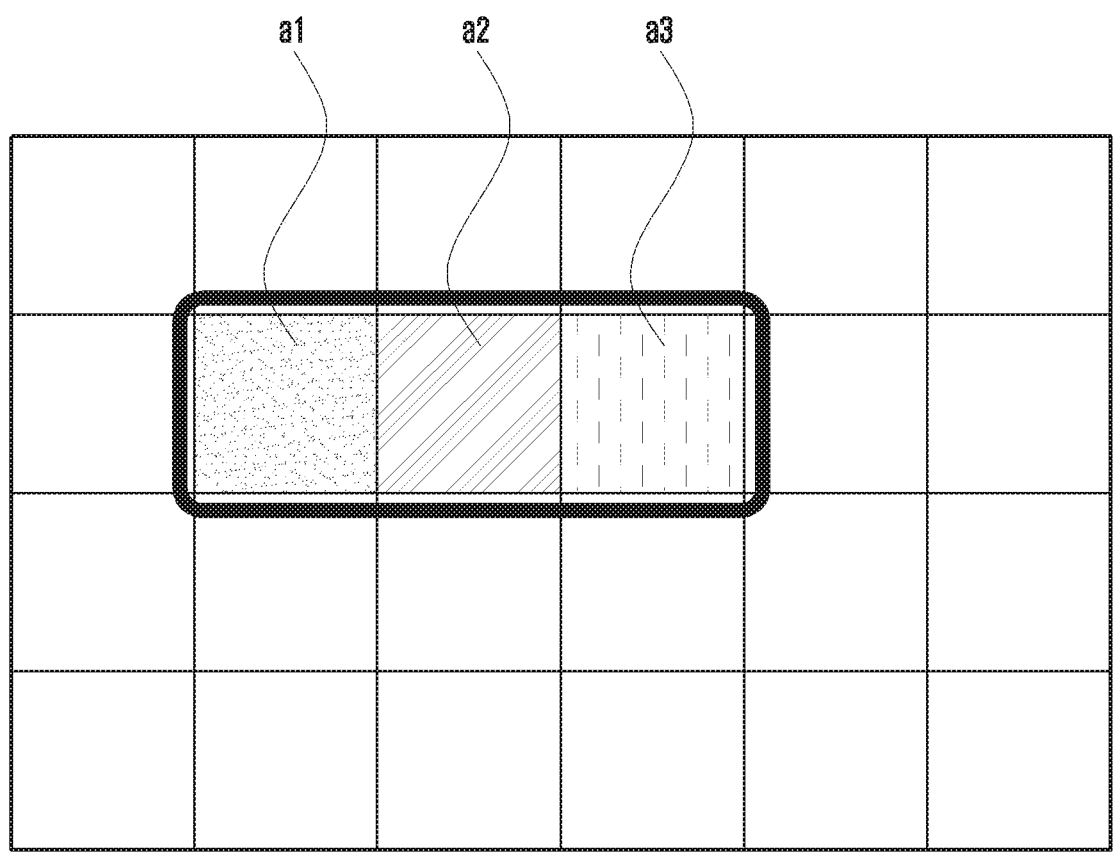
FIG. 2C is a diagram illustrating brightness information detected by an RGB sensor.
Figure 2D:
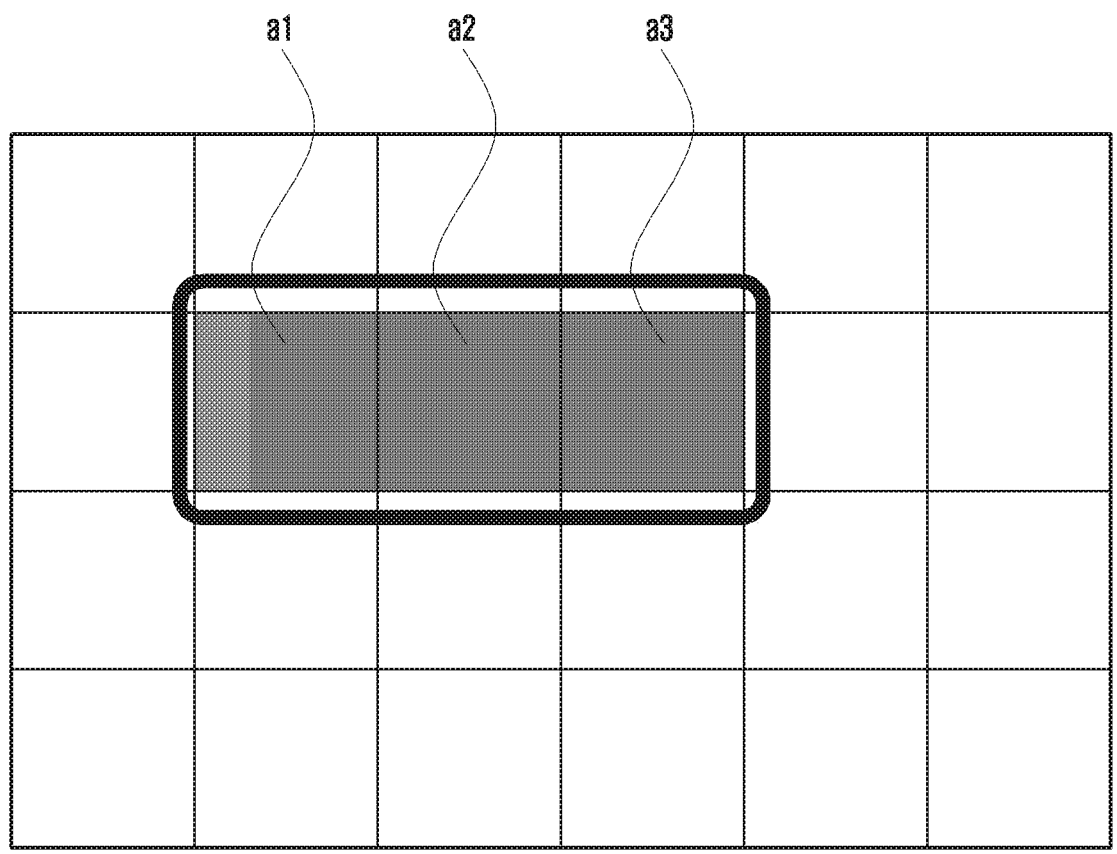
FIG. 2D is a diagram illustrating brightness information detected by a monochrome sensor.

FIG. 2C is a diagram illustrating the brightness information detected by an RGB sensor, and FIG. 2D is a diagram illustrating the brightness information detected by a monochrome sensor.

The parts indicated by broken lines in FIGS. 2C and 2D may be the same areas as the parts indicated by the broken lines in FIGS. 2A and 2B. That is, areas a1, a2, and a3 included in the part indicated by the broken line may have different colors as shown in FIG. 2A.

According to an embodiment, the brightness values of the areas a1, a2, and a3 detected by the RGB sensor may be different from each other. Therefore, the RGB sensor may distinguish areas a1, a2, and a3 using only the brightness information. According to an embodiment, an image may be composed by combining the brightness information and chromatic aberration information.

Conversely, the brightness information detected by the monochrome sensor in the areas a1, a2, and a3 indicated by the broken line may have the same value as shown in FIG. 2D. According to an embodiment, three areas indicated by the broken line in FIG. 2D are shown at the same brightness. That is, the monochrome sensor that composes an image using only brightness information may sense the areas a1, a2, and a3 indicated by the broken line as the same image area.

Accordingly, by taking into consideration the difference in characteristics between the RGB sensor and the monochrome sensor of FIGS. 2A to 2D, a scheme of using the RGB sensor and the monochrome sensor as a dual-image sensor is not appropriate since the monochrome sensor is incapable of distinguishing colors.

Therefore, in order to use a sensor, together with the RGB sensor, as a dual-image sensor, the sensor needs to be capable of distinguishing colors, and needs to be capable of detecting a larger amount of light than the RGB sensor so as to have an excellent SN feature in the low-light environment.

Therefore, the disclosure provides a dual-image sensor system that uses a complementary sensor including a band refection filter, together with an RGB sensor.

Particularly, according to the disclosure, a first sensor included in the dual-image sensor system may sense data associated with a predetermined first wavelength region, a predetermined second wavelength region, or a predetermined third wavelength region. A second sensor may sense data associated with a fourth wavelength region, a fifth wavelength region, or a sixth wavelength region.

Here, the first wavelength region, the second wavelength region, and the third wavelength region may be wavelength regions corresponding to red, green, and blue of the RGB sensor. For example, the first wavelength region is a wavelength region of which the center is 600 nm. The second wavelength region is a wavelength region of which the center is 530 nm. The third wavelength region is a wavelength of which the center is 470 nm.

In the same manner, the fourth wavelength region, the fifth wavelength region, and the sixth wavelength region may be wavelength regions corresponding to magenta, yellow, and cyan of the complementary sensor. Accordingly, the first sensor of the disclosure may include an RGB sensor, and the second sensor may include a complementary sensor.

Figure 3:
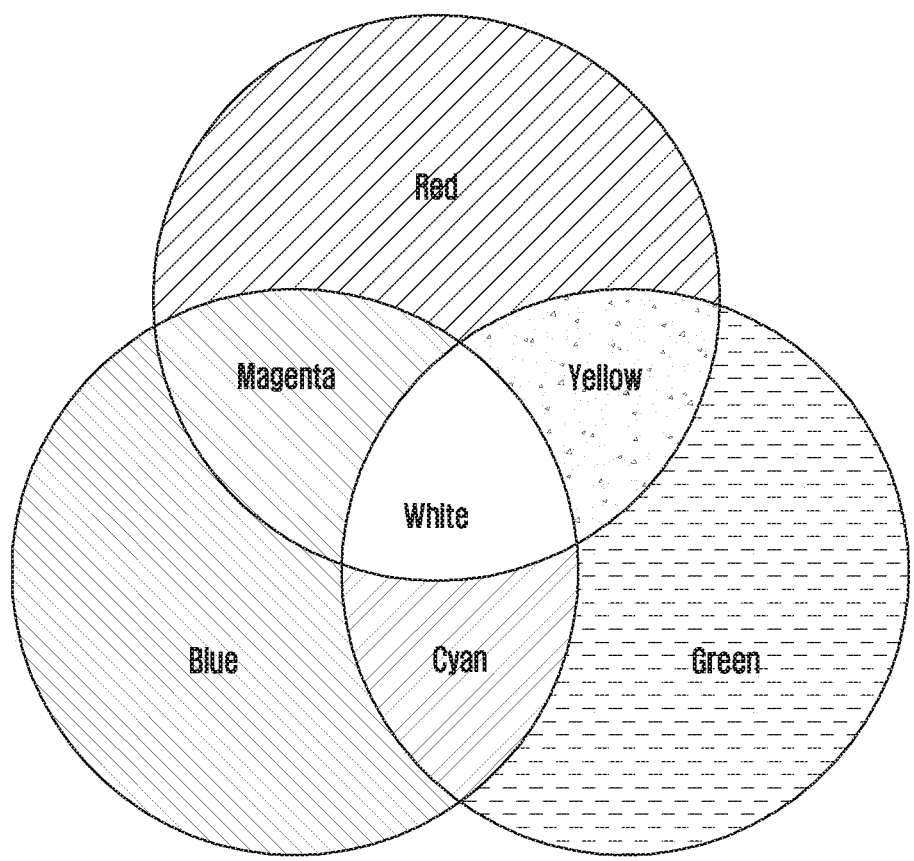
FIG. 3 is a diagram illustrating a light source detected by a first sensor and a second sensor according to an embodiment of the disclosure.

FIG. 3 is a diagram illustrating a light source detected by a first sensor and a second sensor according to an embodiment of the disclosure.

According to the disclosure, the first sensor may sense data associated with a first wavelength region, a second wavelength region, or a third wavelength region. That is, data associated with the three primary colors (red, green, or blue) of light may be detected. The reason that the first sensor is capable of detecting the data associated with the three primary colors of light is that the first sensor includes a band pass filter as mentioned in the description of FIG. 1, and color information of the detected data may be determined depending on a wavelength region that passes the band pass filter.

In the same manner, the second sensor may sense data associated with a fourth wavelength region, a fifth wavelength region, or a sixth wavelength region. That is, data associated with the three primary colors (magenta, yellow, or cyan) of color may be detected. Here, the three primary colors of color indicate colors obtained by reflection by an object.

An object having a predetermined color may absorb light (wavelength) associated with other colors and may reflect light (wavelength) associated with the predetermined color. For example, an object having the color of green may absorb light (wavelength) associated with red and blue, and may reflect light (wavelength) associated with green.

Accordingly, the object may absorb light associated with magenta corresponding to a combination of red and blue, as shown in FIG. 3. In the same manner, yellow may be obtained by combining red and green. Cyan may be obtained by combining green and blue.

Therefore, in consideration of the relationship between the three primary colors of light of FIG. 3, which are red, green, and blue, and the three primary colors of color, which are magenta, yellow, and cyan, it is identified that the second sensor that detects the three primary colors of color is implementable using a band refection filter that removes light having a predetermined wavelength.

For example, the second sensor that detects data associated with magenta may be implemented using a band refection filter that removes a 600 nm wavelength region which is the wavelength region of red.

Also, the first sensor and the second sensor may include a plurality of unit cells. In this instance, the wavelength regions detected by respective unit cells of the first sensor and the second sensor do not overlap each other.

For example, if a first cell of the first sensor is capable of detecting only a first wavelength region of which the center is 470 nm, and is capable of detecting data associated with blue, a first cell of the second sensor may be capable of detecting a fourth wavelength region excluding the wavelength of which the center is 470 nm, and may be capable of detecting data associated with yellow.

Figure 4:
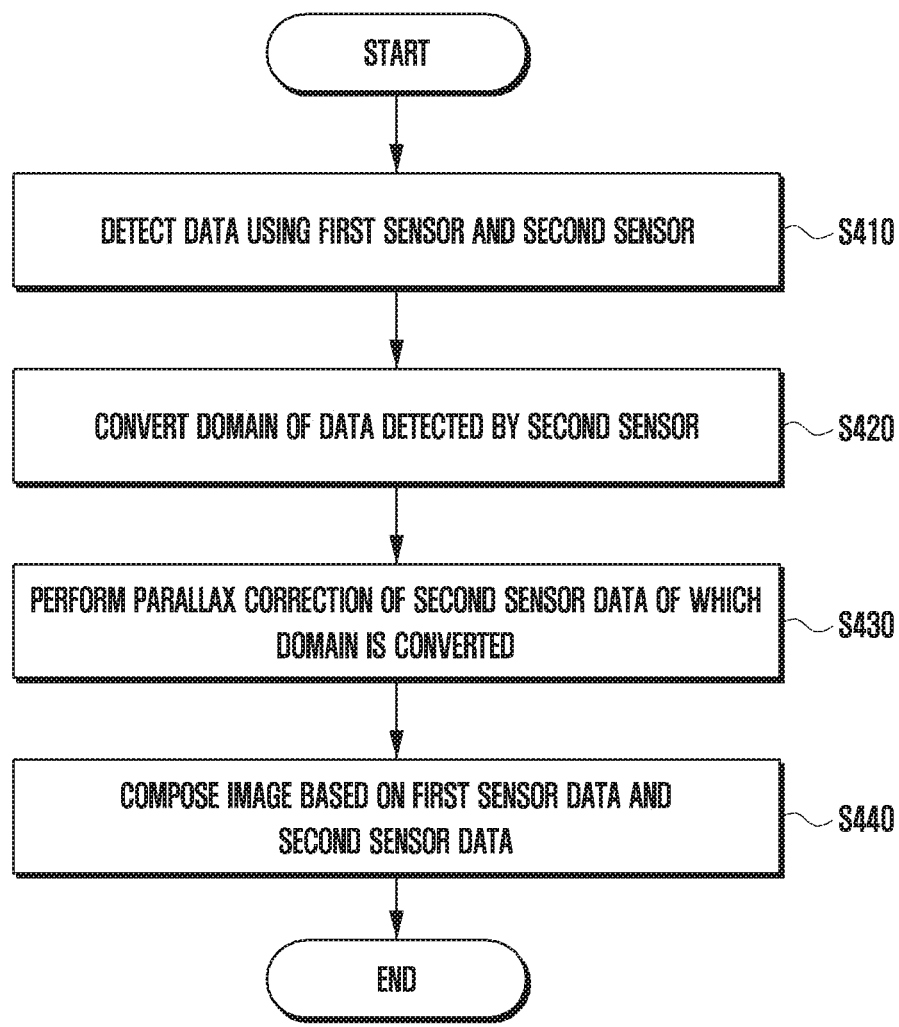
FIG. 4 is a flowchart illustrating an image processing method according to an embodiment of the disclosure.

FIG. 4 is a flowchart illustrating an image processing method according to an embodiment of the disclosure.

In operation S410, data associated with a first sensor and a second sensor may be detected. As described above, the first sensor may sense data associated with a first wavelength region, a second wavelength region, or a third wavelength region (red, green, or blue) which are the three primary colors of light, and an RGB sensor may be included in the first sensor.

In the same manner, the second sensor may sense data associated with a fourth wavelength region, a fifth wavelength region, or a sixth wavelength region (yellow, magenta, or cyan) which are the three primary colors of color, and a complementary sensor may be included in the second sensor.

The first sensor may sense data via a band pass filter that enables only a predetermined wavelength region to pass, and the second sensor may sense data via a band refection filter that removes only a predetermined wavelength region.

Accordingly, the second sensor is capable of detecting a larger amount of light than the first sensor, and the SN performance of an electronic device including the first sensor and the second sensor may be improved.

For example, if the first sensor enables the wavelength region of red to pass, and removes the wavelength regions of green and blue, and the second sensor removes a red wavelength region, and enables wavelength regions of green and blue to pass, the amount of light detected by the second sensor may be two times greater than the amount of light detected by the first sensor. Accordingly, the SN performance of the electronic device including the first sensor and the second sensor may be improved by $\sqrt{2}$ times.

In operation S420, a controller converts the domain of the data detected by the second sensor into the domain of data detected by the first sensor.

The domain of the data detected by the second sensor is associated with magenta, yellow, and cyan, as described above, and thus the domain may be different from the domain of data detected by the first sensor.

Therefore, before combining the data detected by the first sensor and the data detected by the second data, the domain of the data detected by the second sensor may be converted into the domain of the first sensor data.

Particularly, in operation S420, the domain of the data detected by the second sensor may be converted into the domain of the data detected by the first sensor, based on Equation 1.

$$R=(Y+M-C)/2, G=(Y-M+C)/2, B=(-Y+M+C)/2 \quad \text{Equation 1}$$

R: the amount of light of a first wavelength region detected by the first sensor, G: the amount of light of a second wavelength region detected by the first sensor, B: the amount of light of a third wavelength region detected by the first sensor, Y: the amount of light of a fourth wavelength region detected by the second sensor, M: the amount of light of a fifth wavelength region detected by the second sensor, and C: the amount of light of a sixth wavelength region detected by the second sensor.

According to Equation 1, data associated with magenta, yellow, and cyan detected by the second sensor may be converted into data associated with red, green, and blue.

Subsequently, in operation S430, the controller may perform parallax correction of the second sensor data of which the domain is converted.

Generally, the first sensor and the second sensor disposed in the electronic device may not be disposed in the same location and may not overlap each other. Therefore, although the same image is detected, data information associated with the image detected by the first sensor and data information associated with the image detected by the second sensor may be different from each other.

Accordingly, if the data obtained by the first sensor and the data obtained by the second sensor are combined, an error may occur. Therefore, in order to prevent the error, parallax correction of the data detected by the second sensor may be performed.

The method of parallax correction may be determined depending on the locations where the first sensor and the second sensor are disposed in the electronic device, and the method may be determined depending on the types of the first sensor and the second sensor.

In operation S440, an image may be composed based on the parallax-corrected second sensor data and the data detected by the first sensor.

Therefore, according to the disclosure, color component information of a target object obtained by two color image sensors may be used as depth information of an image. Accordingly, the accuracy of the depth information may be improved.

Although only an image processing method of the electronic device that supports a dual-image sensor system is disclosed in the disclosure, the scope of a right of the disclosure is not limited thereto, and may include an image processing method of an electronic device that supports two or more image sensors. Particularly, the scope of a right of the disclosure may include the image processing method of an electronic device that supports a plurality of image sensors which are capable of detecting different amounts of light.

Figure 5:
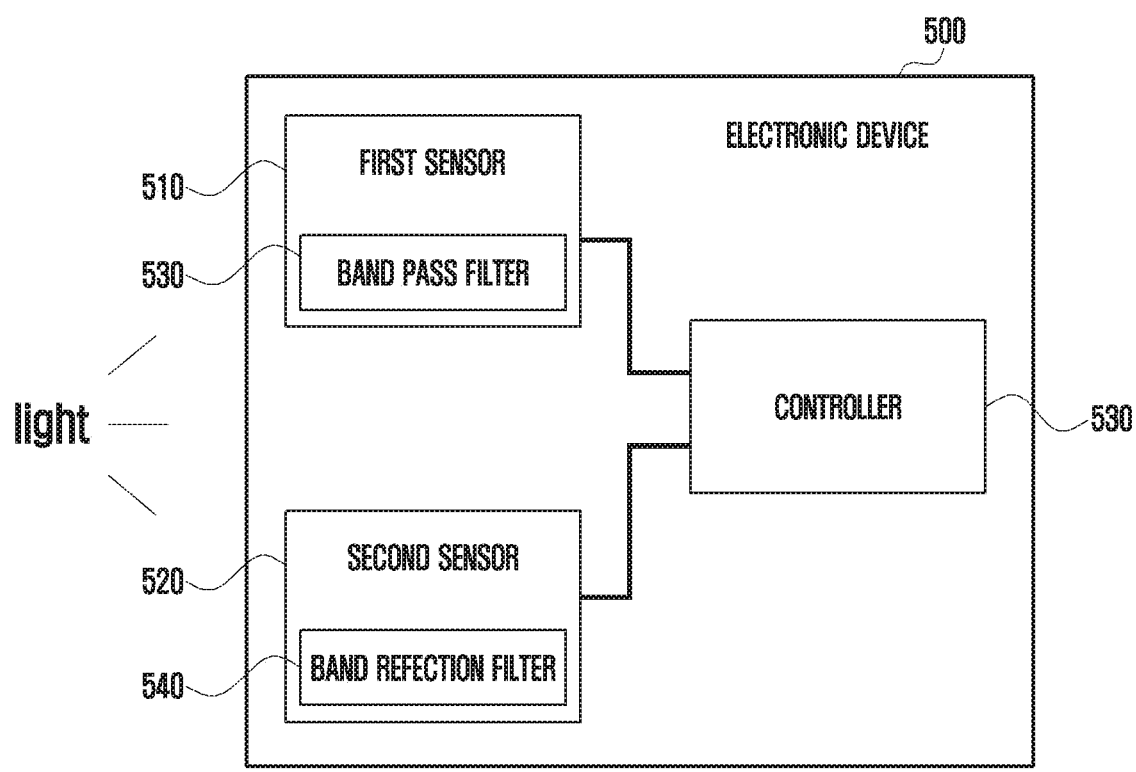
FIG. 5 is a diagram illustrating a configuration of an electronic device according to an embodiment of the disclosure.

FIG. 5 is a diagram illustrating a configuration of an electronic device according to an embodiment of the disclosure.

An electronic device 500 according to the disclosure may include a first sensor 510 disposed in the electronic device 500, a second sensor 520 disposed in the electronic device 500, and a controller 530 configured to compose an image based on data detected by the first sensor 510 and data detected by the second sensor 520. The first sensor 510 and the second sensor 520 are color sensors, and the amount of light detected by the second sensor 520 may be greater than the amount of light detected by the first sensor 510.

The first sensor 510 and the second sensor 520 may include a plurality of unit cells, and the wavelengths detected by respective unit cells of the first sensor 510 and the second sensor 520 may not overlap.

The first sensor 510 may include a band pass filter 530, and the second sensor 520 may include a band refection filter 540.

In addition, the first sensor 510 may sense data associated with a first wavelength region, a second wavelength region, or a third wavelength region. The second sensor 520 may sense a fourth wavelength region, a fifth wavelength region, or a sixth wavelength region. The amount of light detected by the second sensor may be two times greater than the amount of light detected by the first sensor.

The first sensor 510 may sense data associated with the first wavelength region, the second wavelength region, or the third wavelength region (red, green, or blue). The second sensor 520 may sense data associated with the fourth wavelength region, the fifth wavelength region, or the sixth wavelength region (yellow, magenta, or cyan). An RGB sensor may be included in the first sensor 510, and a complementary sensor may be included in the second sensor 520.

The controller 530 may convert the domain of the data detected by the second sensor 520 into the domain of the data detected by the first sensor 510, may perform parallax correction of the data of the second sensor 520, of which the domain is converted, and may compose an image based on the parallax-corrected data of the second sensor 520, of which the domain is converted, and the data detected by the first sensor 510.

Particularly, the controller 530 may convert the domain of the data detected by the second sensor into the domain of the data detected by the first sensor, based on Equation 2.

$$R=(Y+M-C)/2, G=(Y-M+C)/2, B=(-Y+M+C)/2 \qquad \text{Equation 2}$$

R: the amount of light of a first wavelength region detected by the first sensor, G: the amount of light of a second wavelength region detected by the first sensor, B: the amount of light of a third wavelength region detected by the first sensor, Y: the amount of light of a fourth wavelength region detected by the second sensor, M: the amount of light of a fifth wavelength region detected by the second sensor, and C: the amount of light of a sixth wavelength region detected by the second sensor.

Figure 6:
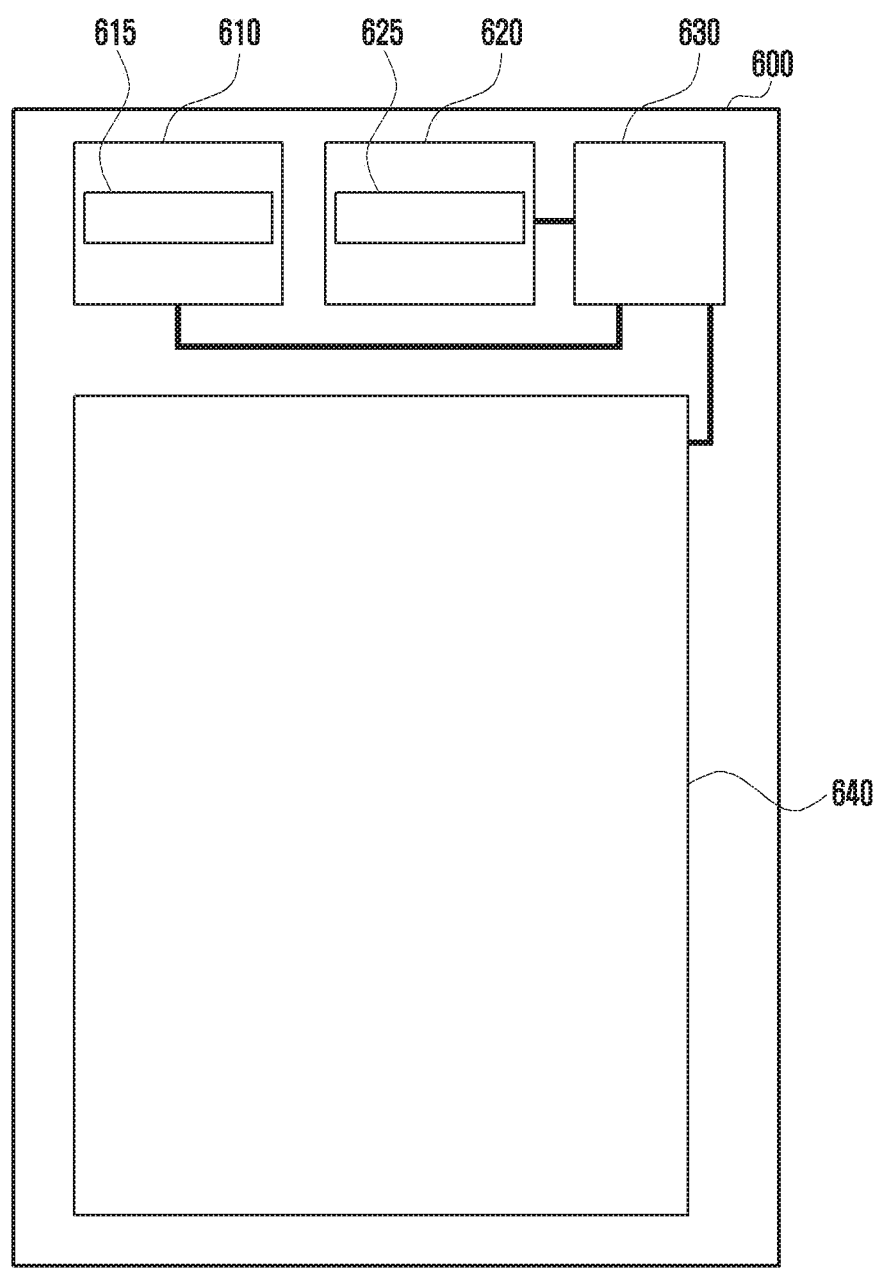
FIG. 6 is a diagram illustrating a configuration of a terminal according to an embodiment of the disclosure.

FIG. 6 is a diagram illustrating a configuration of a terminal according to an embodiment of the disclosure.

A terminal 600 according to the disclosure may include a first lens 610 including a first sensor 615, a second lens 620 including a second sensor 625, a controller 630 configured to compose an image based on data detected by the first lens 610 and data detected by the second lens 620, and a display unit 640 configured to display a composed image.

The first lens 610 and the second lens 620 may be disposed in different locations as shown in FIG. 6. For example, FIG. 6 illustrates the case in which the first lens 610 and the second lens 620 are disposed in the front side of the terminal on which the display 640 is disposed. Unlike the drawing, the first lens 610 or the second lens 620 may be disposed in the rear side of the terminal.

Also, the first sensor 615 and the second sensor 625 are color sensors. The amount of light detected by the second sensor 625 may be larger than the amount of light detected by the first sensor 615.

The first sensor 615 and the second sensor 625 may include a plurality of unit cells, and the wavelengths detected by respective unit cells of the first sensor 615 and the second sensor 625 may not overlap.

The first sensor 615 may include a band pass filter (not illustrated), and the second sensor 625 may include a band refection filter (not illustrated).

In addition, the first sensor 615 may sense data associated with a first wavelength region, a second wavelength region, or a third wavelength region (red, green, or blue). The second sensor 625 may sense data associated with a fourth wavelength region, a fifth wavelength region, or a sixth wavelength region (yellow, magenta, or cyan). An RGB sensor may be included in the first sensor 615, and a complementary sensor may be included in the second sensor 625. Also, the amount of light detected by the second sensor 625 may be two times greater than the amount of light detected by the first sensor 615.

The controller 630 may convert the domain of the data detected by the second lens 620 into the domain of the data detected by the first lens 610, may perform parallax correction of the data of the second lens 620, of which the domain is converted, and may compose an image based on the parallax-corrected data of the second lens 620 and the data detected by the first lens 610.

Particularly, the controller 630 may convert the domain of the data detected by the second lens 620 into the domain of the data detected by the first lens 610, based on Equation 3.

$$R=(Y+M-C)/2, G=(Y-M+C)/2, B=(-Y+M+C)/2 \qquad \text{Equation 3}$$

R: the amount of light of a first wavelength region detected by the first sensor, G: the amount of light of a second wavelength region detected by the first sensor, B: the amount of light of a third wavelength region detected by the first sensor, Y: the amount of light of a fourth wavelength region detected by the second sensor, M: the amount of light of a fifth wavelength region detected by the second sensor, and C: the amount of light of a sixth wavelength region detected by the second sensor.

Meanwhile, the embodiments of the disclosure disclosed in the specification and the drawings have been presented to easily explain technical contents of the disclosure and help comprehension of the disclosure, and do not limit the scope of the disclosure. That is, it is obvious to those skilled in the art to which the disclosure belongs that different modifications can be achieved based on the technical spirit of the disclosure. Further, if necessary, the above respective embodiments may be employed in combination. For example, parts of embodiment 1, embodiment 2, and embodiment 3 of the disclosure are combined so as to employ a base station and a terminal. In addition, the above embodiments are presented based on an LTE system, but other modifications based on the technical spirit of the embodiment can be implemented in other systems such as a 5G or NR system or the like.

The invention claimed is:

1. An image processing method of an electronic device supporting a dual-image sensor system, the method comprising:
    detecting data via a first sensor and a second sensor disposed in the electronic device; and
    composing an image based on data detected by the first sensor and data detected by the second sensor,
    wherein the first sensor and the second sensor are color sensors, and an amount of light detected by the second sensor is larger than an amount of light detected by the first sensor,
    wherein the first sensor detects data associated with a predetermined first wavelength region, a predetermined second wavelength region, or a predetermined third wavelength region, and the second sensor detects data associated with a predetermined fourth wavelength region, a predetermined fifth wavelength region, or a predetermined sixth wavelength region,
    wherein an amount of light detected by the second sensor is two times greater than an amount of light detected by the first sensor, wherein the image composition operation comprises:
converting a domain of the data detected by the second sensor into a domain of the data detected by the first sensor, and
composing the image based on the second sensor data of which the domain is converted and the data detected by the first sensor,
wherein the domain conversion operation comprises:
converting the domain of the data detected by the second sensor into the domain of the data detected by the first sensor, based on Equation 4 as given below:

$$R=(Y+M-C)/2, G=(Y-M+C)/2, B=(-Y+M+C)/2 \qquad \text{Equation 4,}$$

and
wherein R is an amount of light of the first wavelength region detected by the first sensor, G is an amount of light of the second wavelength region detected by the first sensor, B is an amount of light of the third wavelength region detected by the first sensor, Y is an amount of light of the fourth wavelength region detected by the second sensor, M is an amount of light of the fifth wavelength region detected by the second sensor, and C is an amount of light of the sixth wavelength region detected by the second sensor.

2. The method as claimed in claim 1,
wherein the first sensor and the second sensor include a plurality of unit cells, and
wherein wavelength regions detected by respective unit cells of the first sensor and the second sensor do not overlap each other.

3. The method as claimed in claim 1,
wherein the first sensor detects data using a band pass filter, and
wherein the second sensor detects data using a band refection filter.

4. The method as claimed in claim 1, wherein the image composition operation comprises:
performing parallax correction of the second sensor data of which the domain is converted, and composing the image based on the parallax-corrected second sensor data and the data detected by the first sensor.

5. An electronic device that supports a dual-image sensor system, the electronic device comprising:
a first sensor disposed in the electronic device;
a second sensor disposed in the electronic device; and
a controller configured to compose an image based on data detected by the first sensor and data detected by the second sensor,
wherein the first sensor and the second sensor are color sensors,
wherein an amount of light detected by the second sensor is larger than an amount of light detected by the first sensor,
wherein the first sensor detects data associated with a first wavelength region, a second wavelength region, or a third wavelength region, and the second sensor detects data associated with a fourth wavelength region, a fifth wavelength region, or a sixth wavelength region,
wherein an amount of light detected by the second sensor is two times greater than an amount of light detected by the first sensor,
wherein the controller is configured to convert a domain of the data detected by the second sensor into a domain of the data detected by the first sensor, and to compose an image based on the data of the second sensor, of which the domain is converted, and the data detected by the first sensor,
wherein the controller converts the domain of the data detected by the second sensor into the domain of the data detected by the first sensor, based on Equation 5 as given below:

$$R=(Y+M-C)/2, G=(Y-M+C)/2, B=(-Y+M+C)/2 \qquad \text{Equation 5,}$$

and
wherein R is an amount of light of the first wavelength region detected by the first sensor, G is an amount of light of the second wavelength region detected by the first sensor, B is an amount of light of the third wavelength region detected by the first sensor, Y is an amount of light of the fourth wavelength region detected by the second sensor, M is an amount of light of the fifth wavelength region detected by the second sensor, and C is an amount of light of the sixth wavelength region detected by the second sensor.

6. The electronic device as claimed in claim 5,
wherein the first sensor and the second sensor include a plurality of unit cells, and
wherein wavelength regions detected by respective unit cells of the first sensor and the second sensor do not overlap each other.

7. The electronic device as claimed in claim 5,
wherein the first sensor includes a band pass filter, and
wherein the second sensor includes a band refection filter.

8. The electronic device as claimed in claim 5, wherein the controller performs parallax correction of the second sensor data of which the domain is converted, and composes the image based on the parallax-corrected data of the second sensor and the data detected by the first sensor.

* * * * *